(12) United States Patent
Rezler

(10) Patent No.: US 7,914,018 B1
(45) Date of Patent: Mar. 29, 2011

(54) FURNITURE CART

(76) Inventor: Patrick Rezler, Mesa, AZ (US)

( * ) Notice: Subject to any disclaimer, the term of this patent is extended or adjusted under 35 U.S.C. 154(b) by 275 days.

(21) Appl. No.: 12/037,064

(22) Filed: Feb. 25, 2008

Related U.S. Application Data (60) Provisional application No. 60/891,484, filed on Feb. 23, 2007.

(51) Int. Cl.
B62B 1/00 (2006.01)
(52) U.S. Cl. .............. 280/79.3; 280/79.11; 280/79.7
(58) Field of Classification Search .............. 280/79.7, 280/79.3, 79.11, 47.35, 651, 47.34; 211/201, 211/126.15, 134, 27
See application file for complete search history.

(56) References Cited

U.S. PATENT DOCUMENTS

| | | | | |
|---|---|---|---|---|
| 1,563,057 | A * | 11/1925 | Williams | 211/134 |
| 1,912,864 | A * | 6/1933 | Stannard | 211/27 |
| 2,971,768 | A | 2/1961 | Ackley et al. | |
| 3,173,708 | A | 3/1965 | Machielse et al. | |
| 3,420,379 | A * | 1/1969 | Berryman | 280/79.3 |
| 3,582,102 | A * | 6/1971 | Bewick | 280/79.11 |
| 3,689,098 | A | 9/1972 | Rubin | |
| 4,004,819 | A * | 1/1977 | Brongo | 280/79.3 |
| 4,523,768 | A * | 6/1985 | Dlubala | 280/651 |
| 4,588,096 | A * | 5/1986 | Story et al. | 211/126.15 |
| 4,948,154 | A * | 8/1990 | Guggenheim | 280/79.3 |
| 5,090,725 | A * | 2/1992 | Feldner | 280/651 |
| 5,199,729 | A * | 4/1993 | Sievert et al. | 280/47.35 |
| 5,249,823 | A | 10/1993 | McCoy et al. | |
| D357,102 | S | 4/1995 | Tate | |
| 5,484,150 | A * | 1/1996 | Yasutomi | 280/79.3 |
| 5,685,442 | A * | 11/1997 | Yoshino et al. | 211/201 |
| D409,811 | S * | 5/1999 | Hutchinson | D34/21 |
| 6,036,219 | A | 3/2000 | Oefelein et al. | |
| 6,206,385 | B1 | 3/2001 | Kern et al. | |
| 6,923,458 | B2 * | 8/2005 | Hooper et al. | 280/79.3 |
| 7,219,905 | B1 * | 5/2007 | Wilson | 280/79.7 |
| 2001/0005070 | A1 | 6/2001 | Kemnitzer | |

* cited by examiner

Primary Examiner — Hau V Phan
(74) Attorney, Agent, or Firm — Booth Udall, PLC (57) ABSTRACT

A furniture cart for holding and transporting furniture and methods of use. An implementation of a furniture cart comprises an upper surface and a lower surface. A framework assembly is coupled with the upper surface of the furniture platform. The framework assembly comprises opposing vertical side frameworks and at least one upper spanning member coupled with and integral with the opposing vertical side frameworks. Each vertical side framework comprises a front vertical member, a rear vertical member, an upper horizontal member coupled between or integral with the front and rear vertical members, and an auxiliary vertical member between the front and rear vertical members comprising an upper end coupled with or integral with the upper horizontal member. A vertical stop is coupled with the rear vertical members of the framework assembly. At least four wheels are coupled with the lower surface of the furniture platform.

16 Claims, 4 Drawing Sheets

FURNITURE CART

CROSS REFERENCE TO RELATED APPLICATIONS

This document claims the benefit of the filing date of U.S. Provisional Patent Application 60/891,484 entitled "Chair Cart" to Patrick Rezler, which was filed on Feb. 23, 2007, the disclosure of which is hereby incorporated entirely herein by reference.

BACKGROUND

1. Technical Field

Aspects of this document relate generally to furniture carts, including chair and table carts.

2. Background Art

Conventional apparatuses for holding stacked chairs exist. However, they include one or more of the following disadvantages. First, chairs are not easily stackable on these conventional devices. That is, for example, during the process of stacking, the chairs do not stay in place and slide out of position, requiring an extra person to hold the growing stack of chairs in place while others load remaining chairs. Second, these conventional devices are not easily maneuverable and often are top heavy when loaded with chairs and susceptible to tipping. Third, these conventional devices do not easily, if at all, accommodate chairs of different size.

SUMMARY

In one aspect, a furniture cart comprises a furniture platform comprising an upper surface and a lower surface. A framework assembly is coupled with the upper surface of the furniture platform, and the framework assembly comprises opposing vertical side frameworks and at least one upper spanning member one of coupled with and integral with the opposing vertical side frameworks. Each vertical side framework comprises a front vertical member, a rear vertical member, an upper horizontal member one of coupled between and integral with the front and rear vertical members, and an auxiliary vertical member between the front and rear vertical members comprising an upper end one of coupled with and integral with the upper horizontal member. A vertical stop is coupled with the rear vertical members of the framework assembly. At least four wheels are coupled with the lower surface of the furniture platform.

Particular embodiments of a furniture cart may include one or more of the following. The vertical side framework may comprise a u-shaped framework. Each framework assembly may comprise a second auxiliary vertical member between the auxiliary vertical member and one of the front vertical member and the rear vertical member, the second auxiliary vertical member comprising an upper end one of coupled with and integral with the upper horizontal member. A sleeve on each front vertical member and auxiliary vertical member may be provided, each sleeve decreasing a furniture-stackable area of the furniture platform. Each sleeve may be one of an annular sleeve and a penannular sleeve. A second opposing upper front spanning member one of coupled with and integral with the opposing vertical side frameworks may be provided. A third auxiliary vertical member between the front vertical members, the third auxiliary vertical member comprising an upper end one of coupled with and integral with the second opposing upper front spanning member may be provided. A sleeve on the third auxiliary vertical member may be provided. The vertical stop may comprise a first end coupled with the upper surface of the furniture platform. The outside surface of the vertical stop may be coupled with the rear vertical members of the framework assembly. An angle member comprising a first end and a second end, wherein the first end of the angle member may be coupled with the upper surface of the furniture platform, and the second end of the angle member may be coupled with the vertical stop may be provided.

In another aspect, a furniture cart system comprises a furniture cart configured to receive stacked furniture, the furniture cart comprising a furniture platform comprising an upper surface and a lower surface, a framework assembly coupled with the upper surface of the furniture platform, the framework assembly comprising opposing vertical side frameworks and at least one upper spanning member one of coupled with and integral with the opposing vertical side frameworks, wherein each vertical side framework comprises a front vertical member, a rear vertical member, an upper horizontal member one of coupled between and integral with the front and rear vertical members, and an auxiliary vertical member between the front and rear vertical members comprising an upper end one of coupled with and integral with the upper horizontal member. The furniture cart system further comprises a vertical stop coupled with the rear vertical members of the framework assembly, at least four wheels coupled with the lower surface of the furniture platform and at least one piece of furniture stacked on the upper surface of the furniture platform between the opposing vertical side frameworks.

Particular embodiments of a furniture cart system may include one or more of the following. The at least one piece of furniture may be one of at least one folding chair and at least one table. The at least one folding chair may be stacked flat, and wherein the at least one table may be oriented vertically on edge against at least one vertical side framework. A sleeve on each front vertical member and auxiliary vertical member, each sleeve decreasing a furniture-stackable area of the furniture platform may be provided. A third auxiliary vertical member between the front vertical members, the third auxiliary vertical member comprising an upper end one of coupled with and integral with the second opposing upper front spanning member and a sleeve on the third auxiliary vertical member may also be provided.

In still another aspect, a method of stacking furniture comprises introducing at least one piece of furniture between opposing vertical side frameworks of a furniture cart, each vertical side framework comprising a front vertical member, a rear vertical member, an upper horizontal member one of coupled between and integral with the front and rear vertical members, and an auxiliary vertical member between the front and rear vertical members comprising an upper end one of coupled with and integral with the upper horizontal member and the method further comprising stacking the at least one piece of furniture on a furniture platform.

Particular embodiments of a method of stacking furniture may include one or more of the following. The step of introducing at least one piece of furniture may comprise introducing at least one foldable chair between opposing vertical side frameworks of a furniture cart, and may further comprise installing a third auxiliary vertical member between the front vertical members and opposing legs of the at least one foldable chair. The method of stacking furniture may further comprise installing a sleeve on each front vertical member and auxiliary vertical member to decrease a furniture-stackable area of the furniture platform. The step of introducing at least one piece of furniture may further comprise introducing at least one table between opposing vertical side frameworks of a furniture cart, each vertical side framework further comprising a second auxiliary vertical member between the auxiliary vertical member and one of the front vertical member and the rear vertical member, the second auxiliary vertical member comprising an upper end one of coupled with and integral with the upper horizontal member, and wherein the step of stacking the at least one piece of furniture on a furniture platform may comprise stacking the at least one table on a furniture platform vertically on edge and against at least one vertical side framework.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

Aspects of this document relate to furniture carts, including carts for tables and chairs. Generally, a furniture cart may comprise a furniture platform comprising an upper surface and a lower surface. A framework assembly is coupled with the upper surface of the furniture platform, and the framework assembly comprises opposing vertical side frameworks and at least one upper spanning member one of coupled with and integral with the opposing vertical side frameworks. Each vertical side framework comprises a front vertical member, a rear vertical member, an upper horizontal member one of coupled between and integral with the front and rear vertical members, and an auxiliary vertical member between the front and rear vertical members comprising an upper end one of coupled with and integral with the upper horizontal member. A vertical stop is coupled with the rear vertical members of the framework assembly. At least four wheels are coupled with the lower surface of the furniture platform. There are many features of a furniture cart disclosed herein, of which one, a plurality, or all features may be used in any particular implementation Structure/Components There are a variety of furniture cart implementations. Notwithstanding, with reference to FIGS. 1 and 2, front and side perspective views of a furniture cart 100 is illustrated, respectively. Framework assembly 101 may comprise at least one opposing side vertical frameworks 105, which may comprise front vertical member 104, rear vertical member 108, and upper horizontal member 106. One or more opposing side vertical frameworks described in the various implementations of furniture carts described herein may be formed integrally, or they comprise separate front vertical members, rear vertical members, and upper horizontal members that may be removably or permanently coupled. In some implementations of furniture carts described herein, front vertical members, rear vertical members, auxiliary vertical members, and upper horizontal members may comprise tube-like, bar-like, rod-like, strap-like or other similar members. A portion of opposing side vertical framework 105 may be coupled with furniture platform 102 via one or more coupling elements 103. A furniture platform disclosed in the various implementations of furniture carts described in this document may comprise any platform comprising a surface configurable to stack furniture upon and may comprise any material, dimension, shape, gauge, thickness. Coupling elements disclosed in the various implementations of furniture carts described in this document may comprise any permanent or semi-permanent fasteners configurable to couple a framework (or portion thereof) with a furniture platform. In some implementations, coupling elements may comprise quick-release type couplings such as, by way of non-limiting example, a cam lock-type mechanism, or any other mechanism releasably couple two members. A portion of opposing side vertical framework 105 may further be coupled with a portion of vertical stop 116 (which may be coupled with furniture platform 102 via vertical stop fastener 118). A vertical stop disclosed in the various implementations of furniture carts described in this document may comprise any vertical member, framework or the like configurable to provide a surface that may stop furniture from being introduced any further into a furniture cart and against which or adjacent to furniture may be stacked. A vertical stop disclosed in the implementations disclosed in this document may comprise any material, dimension, shape, gauge, thickness.

It will be understood that the furniture-stackable area of a the various implementations of furniture carts disclosed in this document may comprise: the area between one or more opposing front vertical members and a vertical stop; and the area between horizontal members and a furniture platform. In some or all of the implementations of a furniture cart disclosed herein, the furniture-stackable area of a furniture cart may be adjusted such as, by way of non-limiting example, via auxiliary vertical members, sleeves, or adjustment of the various elements comprising a furniture cart.

Figure 1:
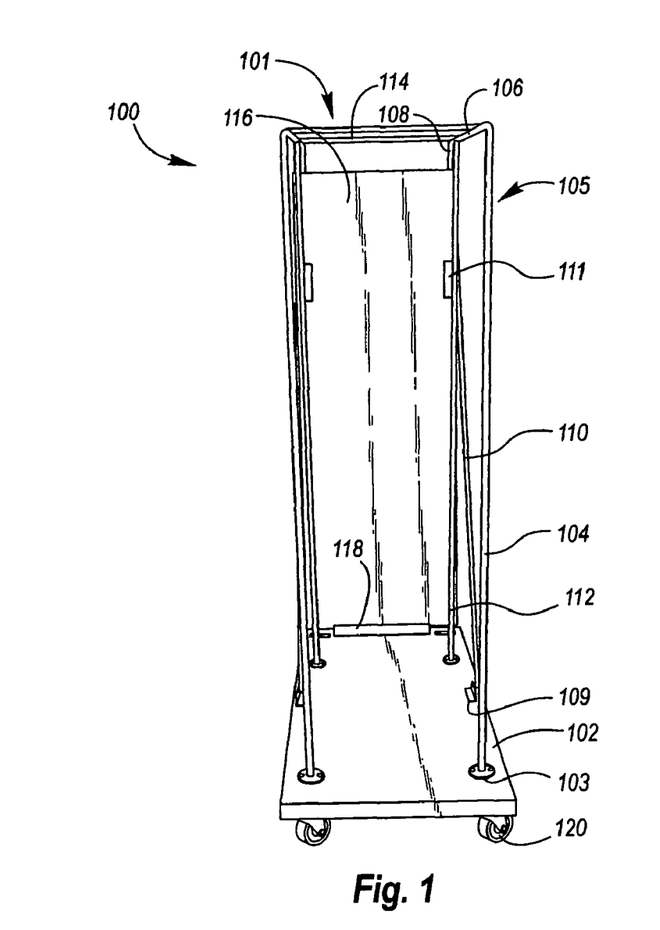
FIG. 1 is a front perspective view of a first implementation of a furniture cart.
Figure 2:
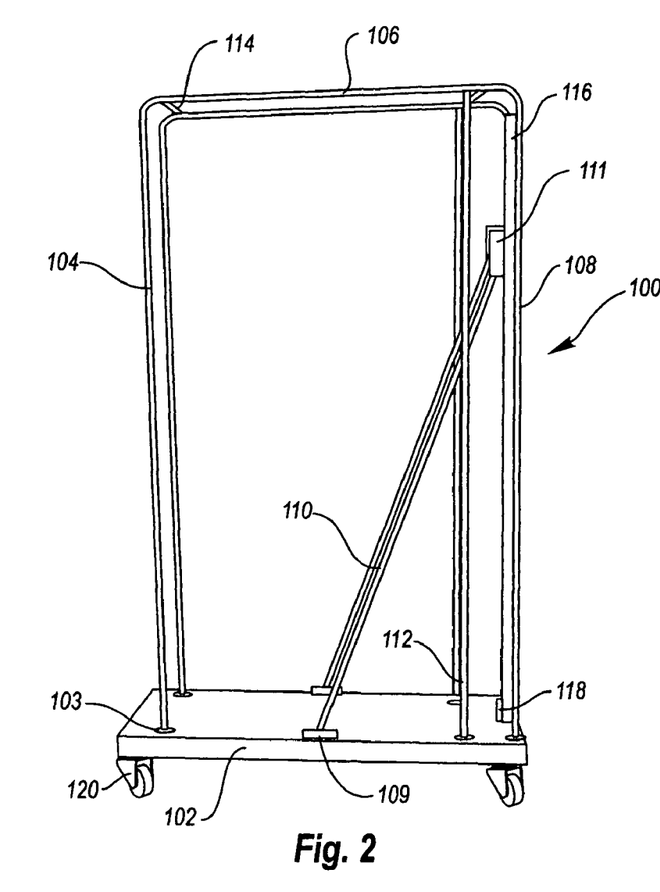
FIG. 2 is a side view of a first implementation of a furniture cart.

Still referring to FIGS. 1 and 2, angle member 110 may be provided and may comprise lower angle member coupling element 109 (which may couple with furniture platform 102) and upper angle member coupling element 111 (which may couple with vertical stop 116). An angle member disclosed in this document may comprise any tube-like, bar-like, rod-like or other similar member configurable to provide structural support, torsional support, rigidity, or the like. A first portion of auxiliary vertical member 112 may be coupled with opposing side vertical framework 105, and a second portion of auxiliary vertical member 112 (different than the first) may be coupled with furniture platform 102 via one or more coupling elements 103. An auxiliary vertical member disclosed in the various implementations disclosed herein may comprise any vertical member configurable to provide support to one or more opposing side vertical frameworks 105 of a furniture cart. In addition, upper spanning member 114 may be provided and may couple one opposing side vertical framework 105 to another opposing side vertical framework 105. One or more wheels 120 may be provided and may be coupled with a lower surface of furniture platform 102.

Figure 3:
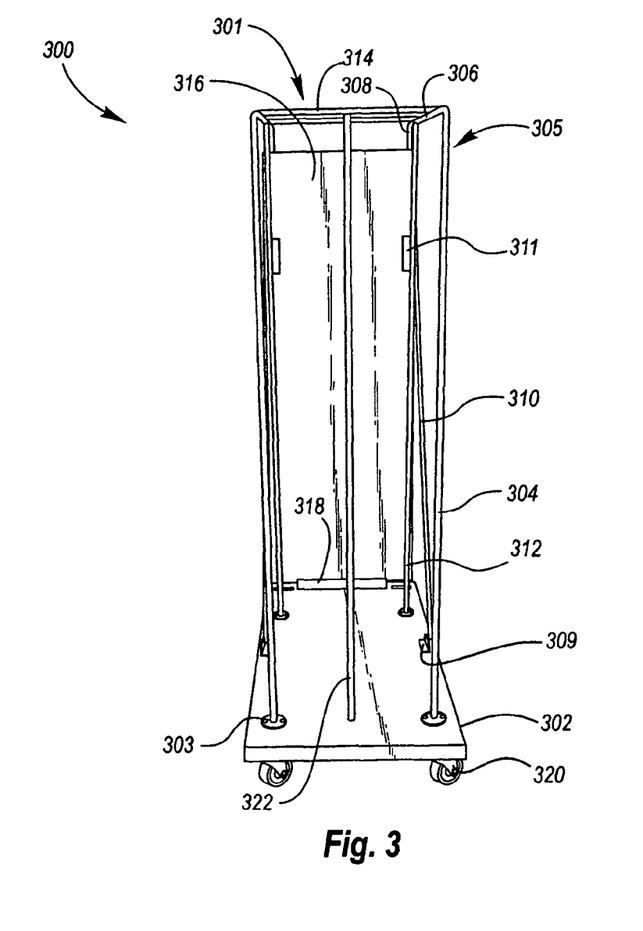
FIG. 3 is a front perspective view of a second implementation of a furniture cart.

With reference to FIG. 3, a front perspective view of a furniture cart 300 is illustrated. Framework assembly 301 may comprise at least one opposing side vertical framework 305, which may comprise front vertical member 304, rear vertical member 308, and upper horizontal member 306. A portion of opposing side vertical framework 305 may be coupled with furniture platform 302 via one or more coupling elements 303. A portion of opposing side vertical framework 305 may further be coupled with a portion of vertical stop 316 (which may be coupled with furniture platform 302 via vertical stop fastener 318). Angle member 310 may be provided and may comprise lower angle member coupling element 309 (which may couple with furniture platform 302) and upper angle member coupling element 311 (which may couple with vertical stop 116. A first portion of auxiliary vertical member 312 may be coupled with opposing side vertical framework 305, and a second portion of auxiliary vertical member 312 (different than the first) may be coupled with furniture platform 302 via one or more coupling elements 303. It will be understood that upper spanning member 314 may be provided and may couple one opposing side vertical framework 305 to another opposing side vertical framework 305. One or more wheels 320 may be provided and may be coupled with a lower surface of furniture platform 302.

In addition, a third auxiliary vertical member 322 comprising an upper end and a lower end may be provided. An upper end of third auxiliary vertical member 322 may be removably or permanently coupled with upper spanning member 314 and a lower end of third auxiliary vertical member 322 may be removably or permanently coupled with a surface of furniture platform 302. It will be understood that third auxiliary vertical member 322 may comprise any vertical member suitable to provide additional support for furniture loaded on a furniture cart. For example, this member could be a bar, a rod, a tube, a strap, an adjustable strap, and the like. Adjustable straps may comprise any known quick-release strap or tiedown straps such as loop-straps, straps with hooks, bungee straps, ratchet straps, and the like. It will be further understood that a third auxiliary member may be coupled with an upper spanning member and/or a furniture platform via one or more quick-release type couplings such as, by way of non-limiting example, a cam lock-type mechanism, anchor members, or any other mechanism configured to readily couple and/or releasably couple two members. A third auxiliary vertical member may be installed on any or all of the implementations of a furniture cart disclosed herein.

Figure 4:
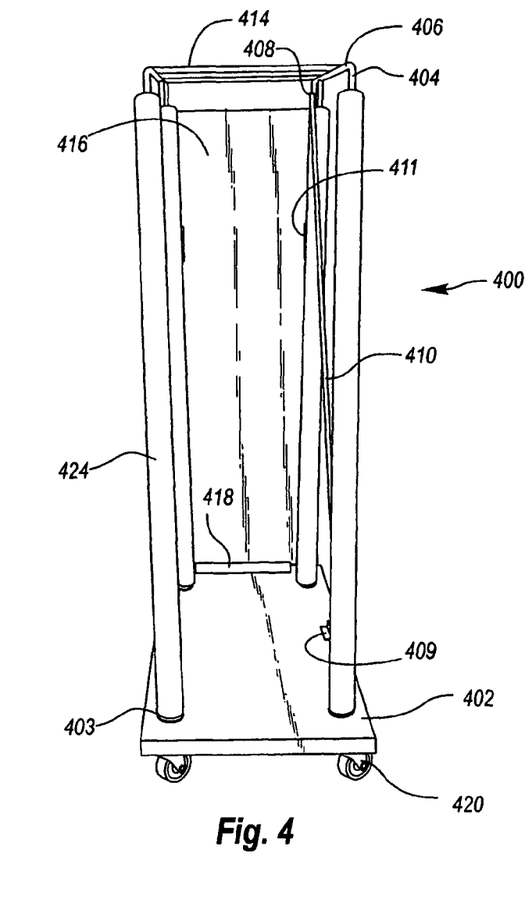
FIG. 4 is a front perspective view of a third implementation of a furniture cart.

With reference to FIG. 4, a front perspective view of a furniture cart 400 is illustrated. Framework assembly 401 may comprise at least one opposing side vertical frameworks 405, which may comprise front vertical member 404, rear vertical member 408, and upper horizontal member 406. A portion of opposing side vertical framework 405 may be coupled with furniture platform 402 via one or more coupling elements 403. A portion of opposing side vertical framework 405 may further be coupled with a portion of vertical stop 416 (which may be coupled with furniture platform 402 via vertical stop fastener 418). Angle member 410 may be provided and may comprise lower angle member coupling element 409 (which may couple with furniture platform 402) and upper angle member coupling element 411 (which may couple with vertical stop 416. A first portion of auxiliary vertical member 412 may be coupled with opposing side vertical framework 405, and a second portion of auxiliary vertical member 412 (different than the first) may be coupled with furniture platform 402 via one or more coupling elements 403. It will be understood that upper spanning member 414 may be provided and may couple one opposing side vertical framework 405 to another opposing side vertical framework 405. One or more wheels 420 may be provided and may be coupled with a lower surface of furniture platform 402. In addition, a third auxiliary vertical member 422 comprising an upper end and a lower end may be provided. An upper end of third auxiliary vertical member 422 may be removably or permanently coupled with upper spanning member 414 and a lower end of third auxiliary vertical member 422 may be removably or permanently coupled with a surface of furniture platform 402. Sleeve 424 may comprise a sleeve or other device configurable to decrease a furniture-stackable area of the furniture platform. One or more sleeves 424 may be removably or permanently coupled with one or more front vertical members 404, one or more upper horizontal members 406, one or more auxiliary vertical members 410, and/or third auxiliary member 422. In addition, in any or all of the implementations of a furniture cart described herein one or more sleeves may be removably or permanently coupled with one or more front vertical members, one or more upper horizontal members, one or more auxiliary vertical members, one or more upper spanning members, and/or one or more third auxiliary members and may reduce or adjust the furniture-stackable area of a furniture cart implementation. In some implementations, sleeves may comprise foam or other shock-absorbent material. In other implementations, sleeves may comprise one of an annular or penannular body. In still other implementations of a furniture cart described herein, one or more sleeves may be stored adjacent to (or within) a vertical stop, when the one or more sleeves are not in use. It will be understood that one or more sleeves may be used in any or all of the implementations of a furniture cart described herein.

Figure 5:
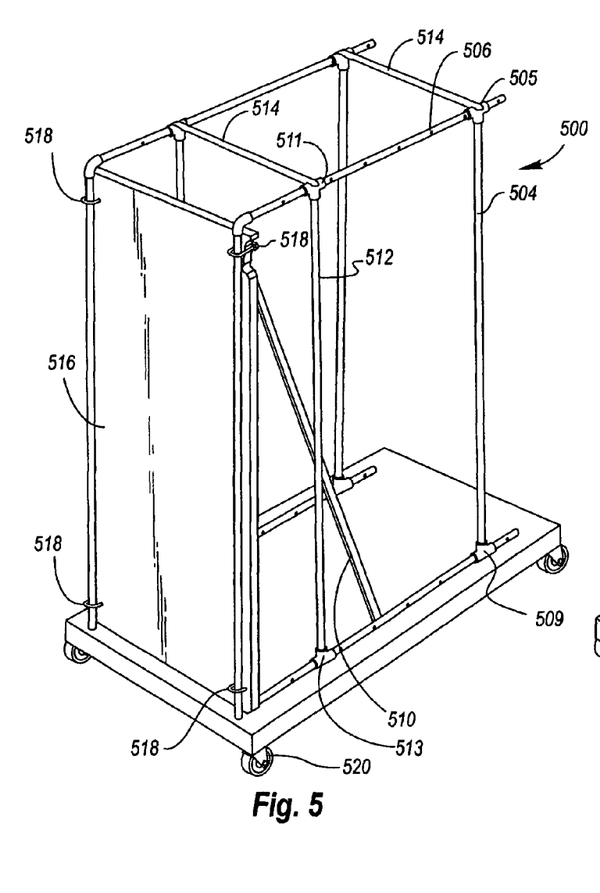
FIG. 5 is a side view of a fourth implementation of a furniture cart.

With reference to FIG. 5, a side view of an adjustable furniture cart 500 is illustrated. Adjustable framework assembly 501 may comprise at least one opposing side vertical adjustable framework 505, which may comprise front adjustable vertical member 504, rear adjustable vertical member 508, and upper adjustable horizontal member 506 and lower adjustable horizontal member 507, each of which may comprise one or more holes, grooves, notches, protrusions, bumps or the like configurable to engage with one or more complementary bumps, protrusions, notches, grooves, or holes comprising one or more adjustable couplers 511. Adjustable coupler 511 may comprise any annular, penannular or other shape configurable to provide an adjustably configurable adjustable framework assembly. It will be understood that complementary elements comprising adjustable vertical member 504, rear adjustable vertical member 508, and upper adjustable horizontal member 506 and lower adjustable horizontal member 507 and adjustable coupling element 511 may allow adjustable framework assembly 501 to be adjusted and may allow a user to adjust a furniture-stackable area of a furniture cart implementation. A portion of opposing adjustable side vertical framework 505 may be coupled with furniture platform 502 via one or more coupling elements 503. A portion of opposing adjustable side vertical framework 505 may further be coupled with a portion of vertical stop 516 (which may be coupled with furniture platform 502). Angle member 510 may be provided and may removably or permanently couple with furniture platform 302 and vertical stop 516. A first portion of adjustable auxiliary vertical member 512 may be coupled with opposing adjustable side vertical framework 505 via upper adjustable coupler 511 and a second portion of adjustable auxiliary vertical member 512 (different than the first) may be coupled with furniture platform 502 via lower adjustable coupler 513. It will be understood that upper adjustable spanning member (not pictured) may be provided and may adjustably couple one opposing adjustable side vertical framework 505 to another opposing adjustable side vertical framework 305. One or more wheels 320 may be provided and may be coupled with a lower surface of furniture platform 302. In addition, an adjustable third auxiliary vertical member (as depicted in FIGS. 3 and 4) comprising an upper end and a lower end may be provided. An upper end of an adjustable third auxiliary vertical member may be removably or permanently coupled with an upper adjustable spanning member and a lower end of an adjustable third auxiliary vertical member may be removably or permanently coupled with a surface of furniture platform 502.

Figure 6:
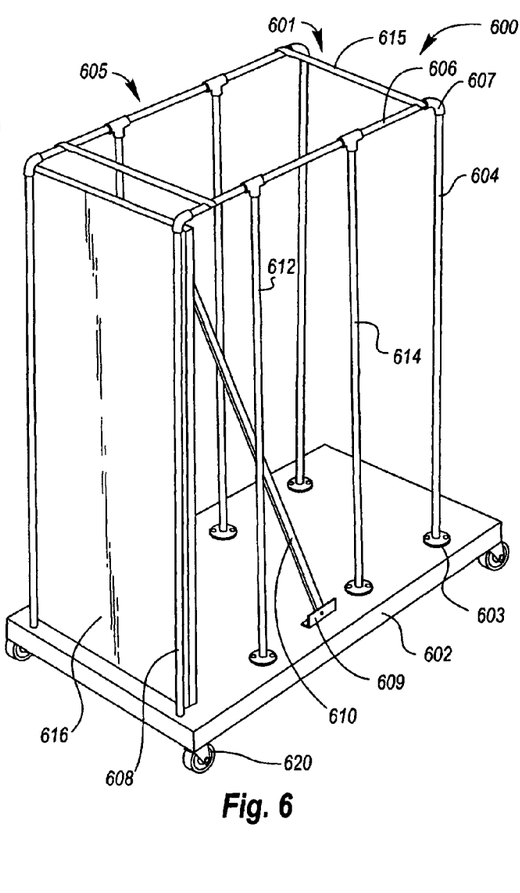
FIG. 6 is a three-quarters perspective view of a fifth implementation of a furniture cart.

With reference to FIG. 6, a front perspective view of a furniture cart 600 is illustrated. Framework assembly 601 may comprise at least one opposing side vertical frameworks 605, which may comprise front vertical member 604, rear vertical member 608, and upper horizontal member 606. A portion of opposing side vertical framework 605 may be coupled with furniture platform 602 via one or more coupling elements 603. A portion of opposing side vertical framework 605 may further be coupled with a portion of vertical stop 618 (which may be coupled with furniture platform 602). Angle member 610 may be provided and may comprise lower angle member coupling element 609 (which may couple with furniture platform 602) and upper angle member coupling element 611 (obscured in this view), which may couple with vertical stop 616. A first portion of auxiliary vertical member 612 may be coupled with opposing side vertical framework 605, and a second portion of auxiliary vertical member 612 (different than the first) may be coupled with furniture platform 602 via one or more coupling elements 603. A second auxiliary vertical member 614 may be provided. A portion of second auxiliary vertical member 614 may be coupled with opposing side vertical framework 605, and a second portion of second auxiliary vertical member 614 (different than the first) may be coupled with furniture platform 602 via one or more coupling elements 603.

Still referring to FIG. 6, upper spanning member 615 may be provided and may couple one opposing side vertical framework 605 to another opposing side vertical framework 605. One or more wheels 620 may be provided and may be coupled with a lower surface of furniture platform 602. In some implementations of a furniture cart 600, a third auxiliary vertical member may be provided (as depicted in FIGS. 3 and 4). In other implementations of a furniture cart 600, one or more sleeves (FIG. 4) may be removably or permanently coupled with one or more front vertical members 604, one or more auxiliary vertical members 610, one or more second auxiliary vertical members 614 and/or a third auxiliary member (not pictured).

Many additional furniture cart implementations are possible in addition to those previously discussed. Further implementations are within the CLAIMS.

All of the foregoing and other implementations may comprise or exhibit one or more of the following advantages. Furniture cart implementations are very easy to load with furniture and the loaded furniture may be more stable during transport. Additionally, furniture cart implementations may be used in both table and chair applications.

Specifications, Materials, Manufacture, Assembly, and Installation

It will be understood that furniture cart implementations are not limited to the specific assemblies, devices and components disclosed in this document, as virtually any assemblies, devices and components consistent with the intended operation of a furniture cart implementation may be utilized. Accordingly, for example, although particular furniture carts, framework assemblies, opposing side vertical frameworks, rear vertical members, upper horizontal members, furniture platforms, coupling elements, vertical stops, vertical stop fasteners, angle members, auxiliary vertical members, second auxiliary vertical members, third auxiliary vertical members, spanning members, sleeves, and other assemblies, devices and components are disclosed, such may comprise any shape, size, style, type, model, version, class, measurement, concentration, material, weight, quantity, and/or the like consistent with the intended operation of a furniture cart implementation. Implementations are not limited to uses of any specific assemblies, devices and components; provided that the assemblies, devices and components selected are consistent with the intended operation of a furniture cart implementation.

Implementations of furniture carts and implementing components may be constructed of a wide variety of materials. For example, the components may be formed of: wood, or the like; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as fiberglass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof. For the exemplary purposes of this disclosure, components may comprise a plastic material like a polyvinyl chloride (PVC).

Some components defining furniture cart and furniture cart assembly implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components.

Operation/Use

Furniture cart implementations may comprise portable, adjustable furniture carts configured to store and transport chairs and/or tables. Furniture cart implementations may be used in a variety of places and applications with similar results, such as in schools, churches, mosques and synagogues, town halls, libraries, convention centers, wedding halls, banquet halls, concert halls, casinos, restaurants, theme parks, zoos, athletic facilities, at catered events, and the like. However, implementations are not limited to uses relating to the foregoing. Rather, any description relating to the foregoing is for the exemplary purposes of this disclosure, and implementations may also be used with similar results for a variety of other applications.

Figure 7:
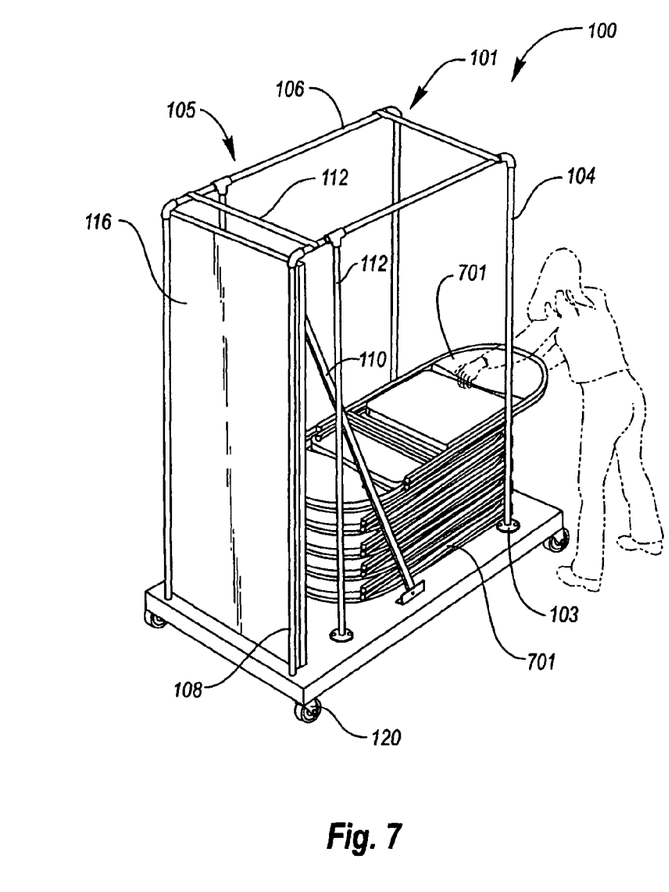
FIG. 7 is an in-use three-quarters perspective view of a first implementation of a furniture cart.

In describing the use of furniture cart implementations further, for the exemplary purposes of this disclosure, and referring to FIGS. 1, 2 and 7, the operation of furniture cart 100 will now be described. A user desiring to load a folding chair onto furniture cart 100 may first fold the chair so that it is substantially flat (as opposed to the chair being in a ready position for sitting). Referring specifically to FIG. 7, a user may introduce a folding chair 701 (first folded flat) between two opposing front vertical members 104. Once folding chair 701 is situated between the two opposing front vertical members 104, a user may thereafter stack folding chair 701 flat upon furniture platform 102 so that a portion of folding chair 701 is in contact with (or substantially adjacent to) vertical stop 116. It will be understood that stacking a folding chair 701 flat relates to stacking the chair in a position other than on its edge or on its top end or bottom end, and as specifically depicted in the non-limiting example provided in FIG. 7. With a folding chair 701 stacked upon furniture platform 102 in the foregoing manner, the chair may be situated between opposing side vertical frameworks 105, between opposing angle members 110, and between opposing auxiliary vertical members. It will be understood that once a user has stacked a first folding chair 701 according to the forgoing method, a user may thereafter load another folding chair 701 onto furniture cart 100 in a similar manner. In addition, a user may continue loading folding chairs 701 until furniture cart 100 has reached a desired (or maximum allowable) capacity. It will be understood that vertical stop 116, opposing side vertical frameworks 105, opposing angle members 110, and opposing auxiliary vertical members may operate to maintain a folding chair 701 in a stacked position with respect to a furniture cart 100 without the requirement of additional labor or person(s) to maintain and hold the chairs in a stacked position. Accordingly, it will be understood that a single user may be able to load folding chairs 701 onto a furniture cart 100 without requiring assistance from another. Once a user has loaded a furniture cart 100 to a desired capacity with one or more folding chairs 701, a user may thereafter transport loaded furniture cart 100 to a desired location.

Referring to FIG. 3, the operation of furniture cart 300 will now be described. A user may desire to load a folding chair onto furniture cart 300 may first fold the chair so that it is substantially flat (as opposed to the chair being in a ready position for sitting). A user may introduce a folding chair (first folded flat) between two opposing front vertical members 304. Once a folding chair is situated between the two opposing front vertical members 304, a user may thereafter stack a folding chair flat upon furniture platform 302 so that a portion of folding chair is in contact with (or substantially adjacent to) vertical stop 316. With a folding chair stacked upon furniture platform 302 in the foregoing manner, a folding chair may be situated between opposing side vertical frameworks 305, between opposing angle members 310, and between opposing auxiliary vertical members. It will be understood that once a user has stacked a first folding chair according to the forgoing method, a user may thereafter load another folding chair onto furniture cart 300. In addition, a user may continue loading folding chairs 301 until furniture cart 300 has reached a desired (or maximum possible or allowable) capacity. It will be understood that vertical stop 316, opposing side vertical frameworks 305, opposing angle members 310, and opposing auxiliary vertical members may operate to maintain a folding chair in a stacked position with respect to a furniture cart 300 without the requirement of additional labor to maintain the chairs in a stacked position. Accordingly, it will be understood that a single user may be able to load folding chairs onto a furniture cart 300 without the requiring assistance from another. Once a user has loaded a furniture cart 300 to a desired capacity with one or more folding chairs, a user may thereafter install a third auxiliary vertical member 322 in the position illustrated. In particular, a third auxiliary vertical member 322 may comprise an upper end and a lower end and may be situated between the front vertical members. An upper end of a third auxiliary vertical member 322 may be permanently or removably coupled with upper spanning member 314 and a lower end of a third auxiliary vertical member may be permanently or removably coupled with the furniture platform 302. It will be understood that a third auxiliary vertical member 322, when installed, may prevent one or more folding chairs from undesirably or even dangerously) sliding out of a stacked position. It will be further understood that a third auxiliary vertical member may be installed in any or all of the implementations of a furniture cart described herein.

Still referring to the operation of FIG. 3, a third auxiliary vertical member 322 may likewise prevent chairs from sliding off furniture cart 300 (during movement of cart 300 or loading and transport of cart 300 on a vehicle for example) between the opposing front vertical members 304. In particular, it will be understood that folding chairs, when folded, may frequently comprise a u-shaped portion where the chair legs have folded together. One or more folding chairs may be stacked on furniture platform 302 with the u-shaped portion formed by the legs positioned on an end of furniture platform 302 opposite vertical stop 316. With the chairs oriented in this manner, third auxiliary vertical member 322 may be installed in the manner described above, and may effectively maintain one or more chairs in a desired position with respect to furniture cart 300. Once loaded, a user may wheelably transport loaded furniture cart 300 to a desired location. It will be understood that a third auxiliary vertical member may be installed in any or all of the implementations of a furniture cart described herein.

Referring to FIG. 4, the operation of furniture cart 400 will now be described. It will be understood that folding chairs (and tables) may comprise a variety of sizes, shapes and other dimensions. Sleeve 424 may comprise a sleeve or other device configurable to decrease a furniture-stackable area of the furniture platform. In particular, one or more sleeves 424 may be removably or permanently coupled with one or more front vertical members 404, one or more upper horizontal members 406, one or more upper spanning members 414, one or more auxiliary vertical members 410, and/or third auxiliary member 422 in order to reduce the furniture-stackable area of furniture cart 400, and may provide a snug fit between furniture and furniture cart 400 (or in any or all implementations of a furniture cart described herein). It will be understood that a user may first load a furniture cart 400 with furniture and then install one or more sleeves 424, or a user (knowing that sleeves may be required by a particular application) may first install one or more sleeves 424 prior to loading the cart with furniture. It will be understood that one or more sleeves 424 may be used in other furniture cart implementations described herein (and still other implementations). In any or all implementations of a furniture cart described herein, one or more sleeves may be stored adjacent to (or within) a vertical stop, when the one or more sleeves are not in use.

In describing the use of furniture cart implementations further, for the exemplary purposes of this disclosure, and referring to FIG. 5, the operation of an adjustable furniture cart 500 will now be described. It will be once again understood that folding chairs (and tables) may comprise a variety of sizes, shapes and other dimensions. Therefore, it will be understood that a user may wish to adjust a furniture cart 500. A user wishing to narrow the distance between opposing side vertical adjustable frameworks 505 may adjust opposing side vertical adjustable frameworks 505 in a position closer together in order to narrow the distance between them. In particular, a user wishing to lower the height of opposing side vertical adjustable frameworks 505 may do so by lowering upper adjustable horizontal member 506 with respect to front adjustable vertical member 504 and rear adjustable vertical member 508 (via adjustable coupler 511). A user wishing to shorten the distance between front adjustable vertical member 504 and vertical stop 514 may adjust front adjustable vertical member 504 with respect to lower adjustable horizontal member 507 (via adjustable coupler 511). It will be understood that a user may adjust furniture cart 500 heightwise, lengthwise, and/or widthwise, in order to provide a desired furniture-stackable area. It will be further understood that a user may adjust furniture cart 500 heightwise, lengthwise, and/or widthwise either before the furniture cart is loaded, or after loading. In addition, an upper end of an adjustable third auxiliary vertical member may be removably or permanently coupled with an upper adjustable spanning member and a lower end of an adjustable third auxiliary vertical member may be removably or permanently coupled with a surface of furniture platform 502 and may provide a snug fit for furniture with respect to furniture cart 500.

Figure 8:
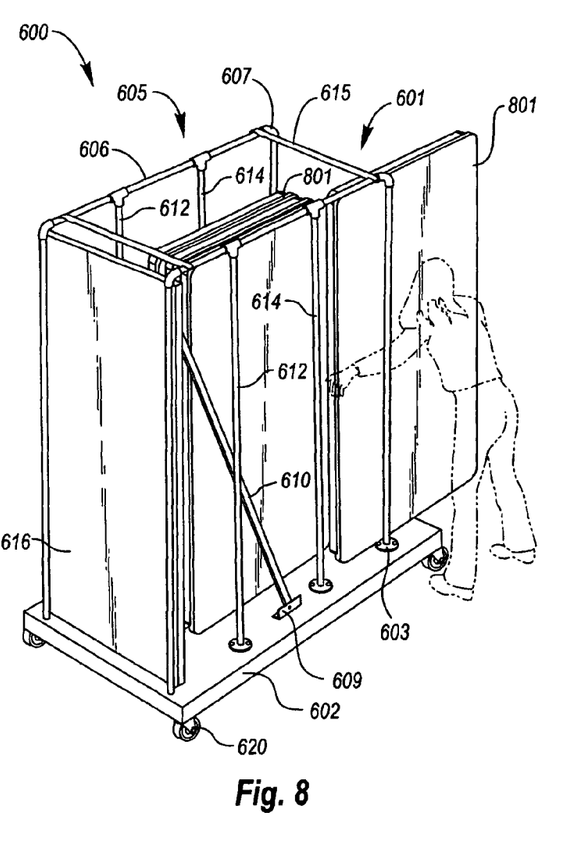
FIG. 8 is an in-use three-quarters perspective view of a fifth implementation of a furniture cart.

Referring to FIGS. 6 and 8, the operation of furniture cart 600 will now be described. A user may desiring to load a folding table onto furniture cart 600 may first fold the table so that it is maintained substantially flat and vertically-oriented on-edge (as opposed to the table being maintained in a horizontal position for ready use). Referring specifically to the non-limiting example provided in FIG. 8, a user may introduce a folding table 801 (first folded substantially flat and vertically-oriented on-edge) between two opposing front vertical members 604. Once folding table 801 is situated between the two opposing front vertical members 604, a user may thereafter stack folding table 801 vertically on-edge (as opposed to flat) upon furniture platform 602 so that a portion of folding table 801 is in contact with (or substantially parallel to) opposing side vertical frameworks 605. It will be understood that stacking a folding table 801 vertically on its edge relates to stacking the table in a position other than flat, as depicted in the non-limiting example provided in FIG. 8. With a folding table 801 stacked upon furniture platform 602 in the foregoing manner, the table may be situated between opposing side vertical frameworks 605, between opposing angle members 610, and between opposing auxiliary vertical members 612. In addition, with a table loaded in the foregoing manner, the table may be situated between opposing second auxiliary vertical members 614. It will be understood that once a user has stacked a first folding table 801 on-edge according to the forgoing method, a user may thereafter load another folding table 801 onto furniture cart 600. In addition, a user may continue loading folding tables 801 until furniture cart 600 has reached a desired (or maximum allowable or possible) capacity. It will be understood that vertical stop 616, opposing side vertical frameworks 605, opposing angle members 610, opposing auxiliary vertical members 612 and second auxiliary vertical members 614 may operate to maintain a folding table 801 in a stacked position with respect to a furniture cart 600 without the requirement of additional labor to maintain the chairs in a stacked position. Accordingly, it will be understood that a single user may be able to load folding tables 801 onto a furniture cart 600 without the requiring assistance from another. Once a user has loaded a furniture cart 600 to a desired capacity with one or more folding tables 801, a user may thereafter transport loaded furniture cart 600 to a desired location.

In places where the description above refers to particular implementations of a furniture cart, it should be readily apparent that a number of modifications may be made without departing from the spirit thereof and that these implementations may be applied to other furniture cart s. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A furniture cart comprising:
   a furniture platform comprising an upper surface and a lower surface;
   a framework assembly coupled with the upper surface of the furniture platform, the framework assembly comprising opposing vertical side frameworks and at least one upper spanning member one of coupled with and integral with the opposing vertical side frameworks, wherein each vertical side framework comprises a front vertical member, a rear vertical member, an upper horizontal member one of coupled between and integral with the front and rear vertical members, and an auxiliary vertical member between the front and rear vertical members comprising an upper end one of coupled with and integral with the upper horizontal member;
   a vertical stop coupled with the rear vertical members of the framework assembly; and
   at least four wheels coupled with the lower surface of the furniture platform.

2. The furniture cart device of claim 1, wherein vertical side framework comprises a u-shaped framework.

3. The furniture cart device of claim 1, wherein each framework assembly comprises a second auxiliary vertical member between the auxiliary vertical member and one of the front vertical member and the rear vertical member, the second auxiliary vertical member comprising an upper end one of coupled with and integral with the upper horizontal member.

4. The furniture cart device of claim 1, further comprising a sleeve on each front vertical member and auxiliary vertical member, each sleeve decreasing a furniture-stackable area of the furniture platform.

5. The furniture cart device of claim 4, wherein each sleeve is one of an annular sleeve and a penannular sleeve.

6. The furniture cart device of claim 1, further comprising a second opposing upper front spanning member one of coupled with and integral with the opposing vertical side frameworks.

7. The furniture cart device of claim 6, further comprising a third auxiliary vertical member between the front vertical members, the third auxiliary vertical member comprising an upper end one of coupled with and integral with the second opposing upper front spanning member.

8. The furniture cart device of claim 7, further comprising a sleeve on the third auxiliary vertical member.

9. The furniture cart device of claim 1, wherein the vertical stop comprises a first end coupled with the upper surface of the furniture platform.

10. The furniture cart device of claim 1, wherein the outside surface of the vertical stop is coupled with the rear vertical members of the framework assembly.

11. The furniture cart device of claim 1, further comprising an angle member comprising a first end and a second end, wherein the first end of the angle member is coupled with the upper surface of the furniture platform, and the second end of the angle member is coupled with the vertical stop.

12. A furniture cart system comprising:
a furniture cart configured to receive stacked furniture, the furniture cart comprising:
a furniture platform comprising an upper surface and a lower surface;
a framework assembly coupled with the upper surface of the furniture platform, the framework assembly comprising opposing vertical side frameworks and at least one upper spanning member one of coupled with and integral with the opposing vertical side frameworks, wherein each vertical side framework comprises a front vertical member, a rear vertical member, an upper horizontal member one of coupled between and integral with the front and rear vertical members, and an auxiliary vertical member between the front and rear vertical members comprising an upper end one of coupled with and integral with the upper horizontal member;
a vertical stop coupled with the rear vertical members of the framework assembly; and
at least four wheels coupled with the lower surface of the furniture platform; and
at least one piece of furniture stacked on the upper surface of the furniture platform between the opposing vertical side frameworks.

13. The furniture cart system of claim 12, wherein the at least one piece of furniture is one of at least one folding chair and at least one table.

14. The furniture cart system of claim 13, wherein the at least one folding chair is stacked flat, and wherein the at least one table is oriented vertically on edge against at least one vertical side framework.

15. The furniture cart system of claim 12, further comprising a sleeve on each front vertical member and auxiliary vertical member, each sleeve decreasing a furniture-stackable area of the furniture platform.

16. The furniture cart device of claim 12, further comprising:
a third auxiliary vertical member between the front vertical members, the third auxiliary vertical member comprising an upper end one of coupled with and integral with the second opposing upper front spanning member; and
a sleeve on the third auxiliary vertical member.

\* \* \* \* \*